(12) United States Patent
Suzuki et al.

(10) Patent No.: US 9,873,228 B2
(45) Date of Patent: Jan. 23, 2018

(54) POWDER MATERIAL FOR THREE DIMENSIONAL MODELING, KIT FOR THREE DIMENSIONAL MODELING, GREEN BODY FOR THREE DIMENSIONAL MODELING, METHOD OF MANUFACTURING THREE DIMENSIONAL OBJECT, METHOD OF MANUFACTURING THREE-DIMENSIONAL GREEN BODY, DEVICE FOR MANUFACTURING THREE-DIMENSIONAL OBJECT, AND DEVICE FOR MANUFACTURING THREE-DIMENSIONAL GREEN BODY

(71) Applicants: Yasuo Suzuki, Shizuoka (JP); Mitsuru Naruse, Shizuoka (JP); Hitoshi Iwatsuki, Shizuoka (JP); Nozomu Tamoto, Shizuoka (JP); Kazumi Ohtaki, Shizuoka (JP); Yasuyuki Yamashita, Shizuoka (JP)

(72) Inventors: Yasuo Suzuki, Shizuoka (JP); Mitsuru Naruse, Shizuoka (JP); Hitoshi Iwatsuki, Shizuoka (JP); Nozomu Tamoto, Shizuoka (JP); Kazumi Ohtaki, Shizuoka (JP); Yasuyuki Yamashita, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 55 days.

(21) Appl. No.: 15/065,316

(22) Filed: Mar. 9, 2016

(65) Prior Publication Data
US 2016/0271877 A1    Sep. 22, 2016

(30) Foreign Application Priority Data

Mar. 18, 2015 (JP) .................................. 2015-054458
Jun. 18, 2015 (JP) .................................. 2015-123063
Nov. 27, 2015 (JP) .................................. 2015-231799

(51) Int. Cl.
*B29C 67/00* (2017.01)
*C08K 9/08* (2006.01)
(Continued)

(52) U.S. Cl.
CPC ........ *B29C 67/0081* (2013.01); *B22F 1/0059* (2013.01); *B22F 3/008* (2013.01);
(Continued)

(58) Field of Classification Search
CPC ......... B33Y 10/00; B33Y 70/00; B33Y 30/00; B33Y 80/00; B33Y 50/02; B29K 2105/251
See application file for complete search history.

(56) References Cited

U.S. PATENT DOCUMENTS

2016/0040025 A1    2/2016  Norikane et al.

FOREIGN PATENT DOCUMENTS

JP        9-057914       3/1997
JP        2006-517856    8/2006
(Continued)

OTHER PUBLICATIONS

U.S. Appl. No. 14/968,184, filed Dec. 14, 2015.
U.S. Appl. No. 14/938,257, filed Nov. 11, 2015.

*Primary Examiner* — Alexandre F Ferre
(74) *Attorney, Agent, or Firm* — Oblon, McClelland, Maier & Neustadt, L.L.P.

(57) ABSTRACT

A powder material for three-dimensional modeling includes a base particle and a resin covering the base particle, wherein the resin has a first absorption peak in the range of from 1,141 $cm^{-1}$ to 1,145 $cm^{-1}$ and a second absorption peak in the range of from 1,089 $cm^{-1}$ to 1,093 $cm^{-1}$ in an infrared absorption spectrum and the intensity ratio of the first (Continued)

absorption peak to the second absorption peak is from 0.40 to 0.70.

13 Claims, 3 Drawing Sheets

(51) Int. Cl.
  *B22F 3/00* (2006.01)
  *B29C 35/04* (2006.01)
  *B33Y 10/00* (2015.01)
  *B33Y 30/00* (2015.01)
  *B33Y 70/00* (2015.01)
  *B22F 1/00* (2006.01)
  *B28B 1/00* (2006.01)
(52) U.S. Cl.
  CPC ............... *B33Y 10/00* (2014.12); *B33Y 30/00* (2014.12); *B33Y 70/00* (2014.12); *B22F 2999/00* (2013.01); *B28B 1/001* (2013.01)

(56) References Cited

FOREIGN PATENT DOCUMENTS

| | | |
|---|---|---|
| JP | 2011-230422 | 11/2011 |
| JP | 5862739 | 1/2016 |
| WO | WO2004/073889 A1 | 9/2004 |
| WO | WO2004/073961 A2 | 9/2004 |
| WO | WO2007/122804 A1 | 11/2007 |
| WO | WO2015/046629 A1 | 4/2015 |

POWDER MATERIAL FOR THREE DIMENSIONAL MODELING, KIT FOR THREE DIMENSIONAL MODELING, GREEN BODY FOR THREE DIMENSIONAL MODELING, METHOD OF MANUFACTURING THREE DIMENSIONAL OBJECT, METHOD OF MANUFACTURING THREE-DIMENSIONAL GREEN BODY, DEVICE FOR MANUFACTURING THREE-DIMENSIONAL OBJECT, AND DEVICE FOR MANUFACTURING THREE-DIMENSIONAL GREEN BODY

CROSS-REFERENCE TO RELATED APPLICATIONS

This patent application is based on and claims priority pursuant to 35 U.S.C. §119 to Japanese Patent Application Nos. 2015-054458, 2015-123063, and 2015-231799, filed on Mar. 18, 2015, Jun. 18, 2015, and Nov. 27, 2015, respectively, in the Japan Patent Office, the entire disclosures of which are hereby incorporated by reference herein.

BACKGROUND

Technical Field

The present invention relates to a powder material for three-dimensional modeling, a kit for three-dimensional modeling, a three-dimensional green body, method of manufacturing three-dimensional object, a method of manufacturing three-dimensional green body, a device for manufacturing three-dimensional object, and a device for manufacturing three-dimensional green body Background Art Lamination modeling (additive manufacturing) methods using three-dimensional (3D) printers capable of manufacturing more complex and finer 3D objects on demand are introduced to supersede typical methods of manufacturing 3D object by utilizing a shaping die. In particular, powder additive manufacturing methods are used in the case of a 3D object made of metal or inorganic compounds. In one of the powder additive manufacturing methods, 3D objects are manufactured by laminating a powder material for 3D modeling of metal, an inorganic compound, etc., and applying a solution to every single or multiple layers in a predetermined pattern. The solution dissolves the powder material to cause powder particles to adhere to each other.

SUMMARY

According to the present invention, provided is an improved powder material for three-dimensional modeling which includes a base particle and a resin covering the base particle, wherein the resin has a first absorption peak in the range of from 1,141 $cm^{-1}$ to 1,145 $cm^{-1}$ and a second absorption peak in the range of from 1,089 $cm^{-1}$ to 1,093 $cm^{-1}$ in an infrared absorption spectrum and the intensity ratio of the first absorption peak to the second absorption peak is from 0.40 to 0.70.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
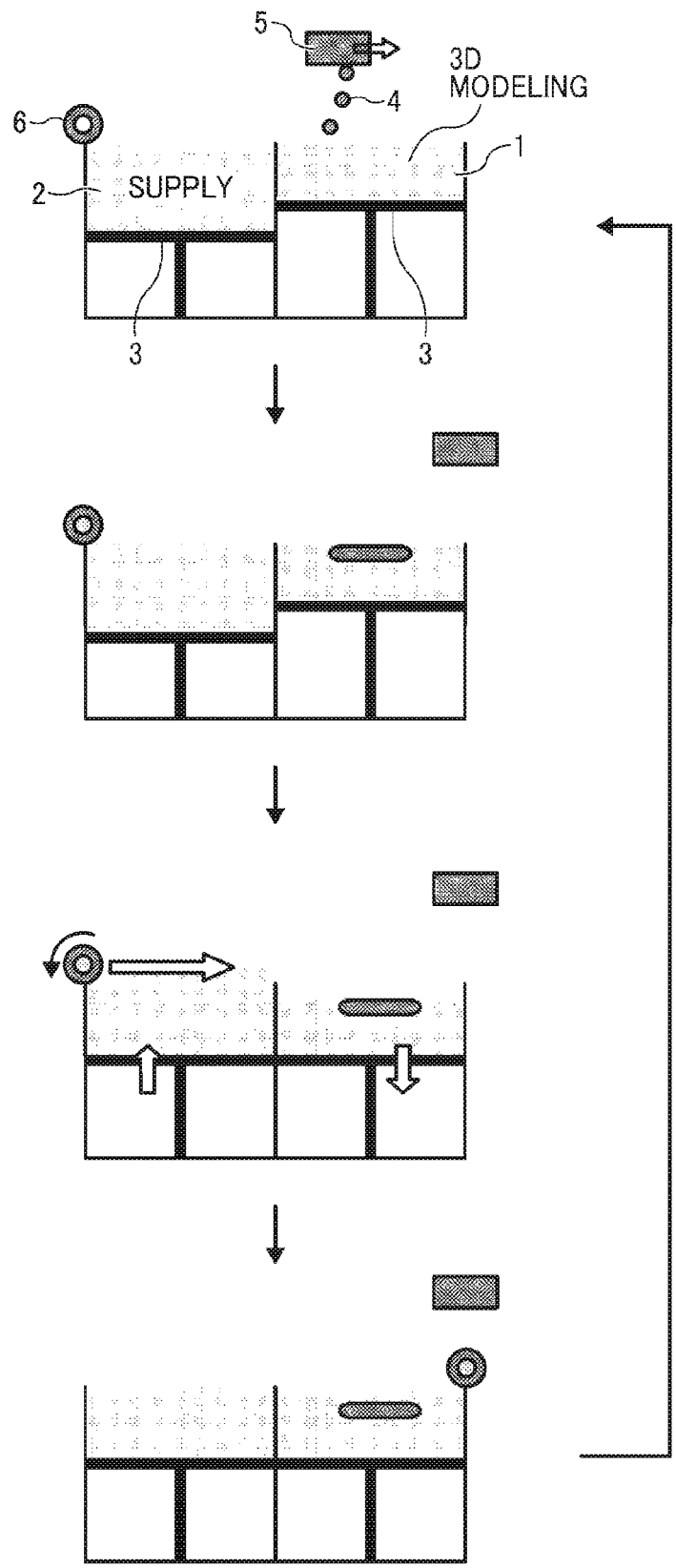
FIG. 1 is a schematic diagram illustrating an example of the device for manufacturing a 3D object according to an embodiment of the present invention.

A 3D object manufactured by a powder additive manufacturing method is taken out of laminated powder material layers and optionally subject to post-processing such as sintering. Therefore, the 3D object has to have strength to bear such processing.

In an attempt to obtain such strength, for example, a modeling liquid having a moisture content of 45 percent or less is used with powder particles covered with a resin having a low level of water solubility as the powder material for 3D modeling. A specific example of the resin is polyvinyl alcohol (PVA). In addition, there is a method forming a layer of a powder material containing a water soluble polymer and dripping a modeling liquid containing water as solvent to the layer to form a 3D object. An example of the water soluble polymer is partially saponified polyvinyl alcohol (PVA) taking powder form.

Moreover, there is a method of manufacturing a 3D object by blending powder polyvinyl alcohol with plaster together with a curing accelerating agent to provide a calcium-based composition showing sufficient strength by a minute quantity of water.

However, the technologies are insufficient to manufacture a 3D object having a complex form and strength. Also, the modeling liquid contains a large quantity of the solvent, which invites issues of safety and a large quantity of the resins contained in the modeling liquid degrades modeling accuracy According to the present disclosure, a powder material for 3D modeling is provided to manufacture a complex 3D object having high level of safety, sufficient strength to maintain the steric (3D) form, and high level of accuracy.

As a result of an investigation made by the present inventors, it was found that a 3D object having sufficient strength and high level of accuracy was manufactured by using a powder material for three-dimensional modeling which includes a base particle and a resin covering the base particle, wherein the resin has a first absorption peak in the range of from 1,141 $cm^{-1}$ to 1,145 $cm^{-1}$ and a second absorption peak in the range of from 1,089 $cm^{-1}$ to 1,093 $cm^{-1}$ in an infrared absorption spectrum and the intensity ratio of the first absorption peak to the second absorption peak is within a particular range. Also, it was found that it was possible to obtain a green body for 3D modeling by drying this 3D object and manufacture a sintered compact by sintering the green body.

Furthermore, it was found that it was desirable to use a particular polyvinyl alcohol as the resin.

That is, the powder material for three-dimensional modeling of the present disclosure employs the following elements.

The powder material for three-dimensional modeling includes a base particle, and a resin covering the base particle, wherein the resin has a first absorption peak in a range of from 1,141 cm$^{-1}$ to 1,145 cm$^{-1}$ and a second absorption peak in the range of from 1,089 cm$^{-1}$ to 1,093 cm$^{-1}$ in an infrared absorption spectrum and the intensity ratio of the first absorption peak to the second absorption peak is from 0.40 to 0.70.

Powder Material for 3D Modeling

The powder material for 3D modeling contains a base particle covered with a resin and other optional components.

In the present disclosure, the resin has a first absorption peak in the range of from 1,141 cm$^{-1}$ to 1,145 cm$^{-1}$ and a second absorption peak in the range of from 1,089 cm$^{-1}$ to 1,093 cm$^{-1}$ in an infrared absorption spectrum and the intensity ratio of the first absorption peak to the second absorption peak is from 0.40 to 0.70. A preferred example of the resin is polyvinyl alcohol. Furthermore, modified polyvinyl alcohols having one of an acetoacetyl group, a carbonyl group, and a butanediol group are preferable. 3D objects made of the powder material for 3D modeling including the base particle covered with such a resin have markedly improved strength.

Non-modified (completely saponified) polyvinyl alcohol for use in a typical powder material for 3D modeling has a high level of crystallinity, so that the resin is very hard but not flexible. Therefore, a 3D object formed of such a resin is easily broken under bending stress. In addition, in the method of manufacturing a 3D object described in the present disclosure, the 3D object is manufactured by applying a modeling liquid containing a solvent that dissolves the resin to a particular area of the powder material layer for 3D modeling. The resin solubility and the permeability of the modeling liquid during application of the modeling liquid are found to have an impact on the strength of the 3D object and the sintered compact.

By using a resin having the property and the structure described in the present disclosure, crystallinity of the powder material deteriorates, thereby increasing hydrophilicity. As a result, the solubility and permeability to the modeling liquid become in a preferable range. However, if the absorption peak intensity ratio mentioned above is less than 0.40, the solubility increases but the storage property of the powder material deteriorates or the moisture absorbency thereof increases. This makes it difficult to form a uniform powder material layer during formation of the powder material layer. If the absorption peak intensity ratio mentioned above surpasses 0.70, the solubility of the powder material in a modeling liquid deteriorates, thereby degrading the strength of an obtained 3D object and a sintered compact obtained after sintering.

The crystallinity of a resin can be controlled by various methods such as treatment of a base material, drawing treatment, addition of a crystallizing agent, and heating and cooling after dissolution of a resin. For example, due to drawing treatment, the directionality of resin chain increases, thereby improving crystallinity. This leads to remarked improvement of strength. When a crystallizing agent such as an organic and inorganic hybrid filler is added, crystallinity of a resin is known to ameliorate. In addition, in the heating and cooling after dissolution of a resin, rapid cooling after heating and dissolution promotes amorphous and slow cooling promotes crystallinity. Also, crystallinity is known to be controlled by heating instead of dissolution. The present inventors have found that the crystallinity of a resin and the solubility thereof in a modeling liquid for use in 3D modeling significantly change depending on the temperature condition in the application process and moreover, as a consequence, the strength of a 3D object can be controlled.

The present inventors also have found that crystallinity of a resin greatly changes depending on the temperature condition in the drying process after application of a modeling liquid, which consequently improves the strength of a green body for 3D modeling and maintains accuracy thereof.

Figure 3:
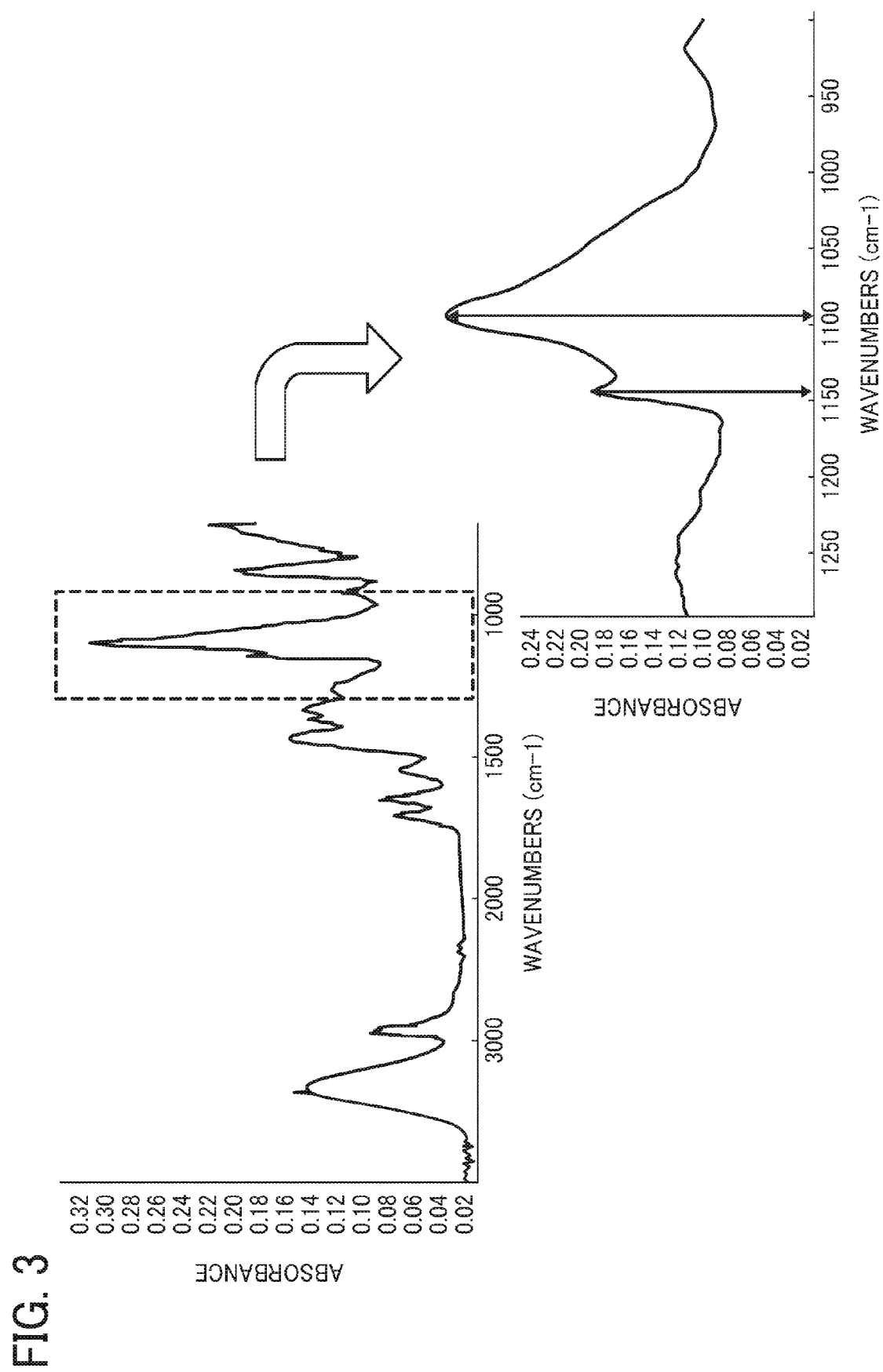
FIG. 3 is a schematic diagram illustrating an example of the infrared spectrum of the resin for use in an embodiment of the present invention.

The infrared absorption spectrum of a resin that covers a base particle and a resin contained in a green body for 3D modeling can be measured by a Fourier transform infrared spectroscopy (FT-IR) instrument available on market. The absorption peak ratio represented by (1,141 cm$^{-1}$ to 1,145 cm$^{-1}$)/(1,089 cm$^{-1}$ to 1,093 cm$^{-1}$) is calculated by the absorption values of the infrared absorption spectrum after removal of the background. In the example illustrated in FIG. 3, the absorption peak intensity ratio [(peak intensity of 1,141 cm$^{-1}$ to 1,145 cm$^{-1}$)/(peak intensity 1,089 cm$^{-1}$ to 1,093 cm$^{-1}$)] is 0.67. As described above, the 3D object and the green body for 3D modeling including the base particle and the resin manufactured by using the powder material for 3D modeling described above have markedly improved strength in comparison with typically manufactured 3D object and green body. In addition, since permeability of the modeling liquid is in a suitable range, the modeling accuracy is improved. Furthermore, the 3D object and the green body for 3D modeling become not easily broken or scratched, which leads to higher modeling accuracy.

Base Particle

Examples of materials of the base particle are metal, ceramic, carbon, polymers, wood, and biocompatible materials. Of these, metal and ceramic bearable to sintering are preferable in terms of manufacturing a 3D object having a high level of strength.

Specific examples of the metal include, but are not limited to, stainless steel (SUS), iron, copper, titanium, marageing steel, and silver. A specific example of the stainless steel (SUS) is SUS316L. Specific examples of titanium include, but are not limited to, pure titanium and ASTM B348 Gr5. Specific examples of the ceramic include, but are not limited to, metal oxides such as silica ($SiO_2$), alumina ($Al_2O_3$), zirconia ($ZrO_2$), and titania ($TiO_2$).

Specific examples of the carbon include, but are not limited to, graphite, graphen, carbon nanotube, carbon nanohorn, and fullerene. Examples of the polymer are known resins insoluble in water. Specific examples of the wood include, but are not limited to, wood chip and cellulose. Specific examples of the biocompatible materials include, but are not limited to, polylactic acid and calcium phosphate. These materials can be used alone or in combination.

It is possible to use products available on market formed of these materials as the base particle. Specific examples of such products include, but are not limited to, SUS316L (PSS316L, manufactured by Sanyo Special Steel Co., Ltd.), $SiO_2$ (EXCELICA SE-15K, manufactured by Tokuyama Corporation), $AlO_2$ (TAIMICRON TM-5D, manufactured by TAIMEI CHEMICALS Co., Ltd.), and $ZrO_2$ (TZ-B53, manufactured by TOSOH CORPORATION). The base particle may be subject to known surface reforming treatment in order to improve affinity with the resin.

The volume average particle diameter of the base particle is not particularly limited. The volume average particle diameter is preferably from 0.1 μm to 500 μm, more preferably from 5 μm to 300 μm, and furthermore preferably from 15 μm to 250 μm. When the volume average particle diameter is in the range of from 0.1 μm to 500 μm, the manufacturing efficiency of 3D objects is excellent and handling property is also good. If a thin layer is formed by using the powder for 3D modeling described above when the volume average particle diameter is 500 μm or less, the filling rate of the powder for 3D modeling in the thin layer is improved, meaning that voids, etc. do not easily appear in the thus-obtained 3D object. The volume average particle diameter of the base particle can be measured according to known methods using a known particle diameter measuring instrument such as Microtrac HRA (manufactured by NIKKISO CO., LTD.). The particle size distribution of the base particle is not particularly limited and can be suitably selected to a particular application.

The shape, surface area, circularity, fluidity, wettability, etc. of the base particle are suitably selected to a particular application.

Resin

The resin that covers the base particle has a first absorption peak in the range of from 1,141 $cm^{-1}$ to 1,145 $cm^{-1}$ and a second absorption peak in the range of from 1,089 $cm^{-1}$ to 1,093 $cm^{-1}$ in an infrared absorption spectrum. A preferred example of the resin is polyvinyl alcohol.

The resin having a first absorption peak in the range of from 1,141 $cm^{-1}$ to 1,145 $cm^{-1}$ and a second absorption peak in the range of from 1,089 $cm^{-2}$ to 1,093 $cm^{-2}$ in an infrared absorption spectrum is dissolved in a modeling liquid described later. In the present disclosure, the dissolution property of the resin means that, for example, when 1 g of the resin described above is mixed and stirred in 100 g of a solvent constituting a modeling liquid at 30 degrees C., 90 percent by mass or more of the resin is dissolved therein.

In addition, when the average degree of polymerization of the resin is in the range of from 400 to 1,100, the strength of a 3D object is improved. It is more preferable to use a modified polyvinyl alcohol having an acetacetyl group, a carbonyl group, or a butanediol group and an average degree of polymerization from 400 to 1,100 because the strength of a 3D object is improved. Furthermore, if a cross-linking agent is used in the modeling liquid, the resin is cross-linked, thereby further improving the strength of the resins itself.

The resin having a first absorption peak in the range of from 1,141 $cm^{-1}$ to 1,145 $cm^{-1}$ and a second absorption peak in the range of from 1,089 $cm^{-1}$ to 1,093 $cm^{-1}$ in an infrared absorption spectrum is available on market. Specific examples of the resin include, but are not limited to, polyvinyl alcohol (PVA-105C, PVA-205C, and PVA-220C, manufactured by KURARAY CO., LTD.), acetoacetyl group modified polyvinyl alcohol (GOHSEFIMER Z-300, manufactured by The Nippon Synthetic Chemical Industry Co., Ltd.), carboxyl group modified polyvinyl alcohol (Gohsenx Z-330, Gohsenx Z-100, Gohsenx™ Z-200, Gohsenx™ Z-205, Gohsenx™ Z-210, and Gohsenx™ Z-220, manufactured by The Nippon Synthetic Chemical Industry Co., Ltd.), copolymers of butanediol vinylalcohol (Nichigo G-Polymer™ OKS-8089, Nichigo G-Polymer™ OKS-8041, Nichigo G-Polymer™ OKS-8049, and Nichigo G-Polymer™ OKS-1080, manufactured by The Nippon Synthetic Chemical Industry Co., Ltd.), DF-03 (average degree of polymerization: 300), DF-05 (average degree of polymerization: 500), DF-17 (average degree of polymerization: 1,700), and DF-20 (average degree of polymerization: 2,000) of D-PVA series of JAPAN VAM & POVAL CO., LTD., and JF-05S (average degree of polymerization: 500) and JP-05S (average degree of polymerization: 500) of J-PVA series of JAPAN VAM & POVAL CO., LTD. These resins can be used alone or in combination to a degree that the combination does not impair the effect of the present disclosure.

These resins are mixed with the base particle as the powder material for 3D modeling and preferably cover the base particle. When the base particle is thinly coated with the resin, the modeling liquid can uniformly be applied and the solubility of the resin is improved. As a result, a green body for 3D modeling having a high level of strength with a uniform amount of the resin is obtained. When the amount of the resin is excessively large, voids tend to appear during removal of grease, thereby lowering the density of the obtained 3D object so that the strength of the 3D object becomes low.

The resin particulate preferably has an average coverage thickness of from 5 nm to 500 nm, more preferably from 50 nm to 300 nm, and furthermore preferably from 100 nm to 200 nm.

When the coverage thickness is in the range of from 5 nm to 500 nm, the strength of a manufactured 3D object and the dimension accuracy during sintering are improved.

The coverage thickness can be obtained by, for example, embedding the powder material for 3D modeling in an acrylic resin, etc., exposing the surface of the base particle by etching, etc., and thereafter measuring the thickness with a scanning tunneling microscope (STM), an atomic force microscope (AFM), or a scanning electron microscope (SEM).

Specifically, a sample for observation is prepared by polishing the surface of the powder material for 3D modeling with emery paper and thereafter slightly polishing the surface with a wet cloth to dissolve the resin portion. Next, the border between the base portion and the resin portion, exposed to the surface is observed by a field-emission-type scanning electron microscope (FE-SEM) and the length between the surface of the resin portion and the border is measured as the coverage thickness. Thereafter, the average of the ten measured points is obtained as the coverage thickness (average thickness).

The coverage ratio (area ratio) of the surface of the base particle is not particularly limited and can be suitably selected to a particular application. For example, it is preferably 15 percent or more, more preferably 50 percent or more, and particularly preferably 80 percent or more. The higher the coverage ratio is, the stronger a 3D object becomes. The coverage ratio is obtained by, for example, observing a photograph of the powder material for 3D modeling and calculating the average of the area ratio (percent) of the portion covered with the resin to all the area of the surface of the base particle about the powder material for 3D modeling in the two-dimensional photograph.

Other Components

The other optional components are not particularly limited and can be selected to a suitable application. Examples thereof are a fluidizer, a filler, a leveling agent, a sintering helping agent, and a surfactant. It is preferable that the powder for 3D modeling contains a fluidizer because layers of the powder material for 3D modeling are easily and efficiently formed. It is preferable that the powder material for 3D modeling contains a filler because voids etc. do not easily appear in an obtained cured object (3D object, cured object for sintering). It is preferable that the powder material for 3D modeling contains a leveling agent because the wettability of the powder material for 3D modeling ameliorates, thereby improving handling property, etc. It is preferable that the powder material for 3D modeling contains a sintering helping agent because it is possible to sinter an obtained cured object (3D object, cured object for sintering) at lower temperatures.

Method of Covering with Resin

The powder material for 3D modeling of the present disclosure is obtained by covering the surface of the base particle with a resin. The method of covering the base particle with a resin is not particularly limited. The base particle can be covered by a known method. For example, a tumbling fluidizing coating method, a spray drying method, a stirring mixing addition method, a tipping method, a kneader coating method, etc. are suitable. Of these, a tumbling fluidizing coating method is preferable because the coverage layer is beautifully coated.

Properties of Powder Material for 3D Modeling

The volume average particle diameter of the powder for 3D modeling is not particularly limited and can be suitably determined to a particular application. The volume average particle diameter is preferably from 3 µm to 200 µm, more preferably from 5 µm to 150 µm, and particularly preferably from 10 µm to 85 µm. When the volume average particle diameter is 3 µm or greater, the fluidity of the powder is improved, the powder layer is easily formed, so that the smoothness of the surface of the laminated layers ameliorates. As a consequence, the manufacturing efficiency and handling property, and dimension accuracy of the 3D object tend to be better. In addition, when the volume average particle diameter is 250 µm or less, the space between the powder particles is reduced, thereby decreasing the void ratio of a thus-obtained 3D object, which contributes to enhancement of the strength thereof. Accordingly, the volume average particle diameter is preferably from 3 µm to 250 µm to strike a balance between the dimension accuracy and the strength.

The volume average particle diameter of the powder material for 3D modeling can be measured by a known particle size measuring device, such as Microtrac HRA (manufactured by NIKKISO CO., LTD.) according to a known method.

The particle size distribution of the powder material for 3D modeling is not particularly limited and can be suitably determined to a particular application.

The powder material for 3D modeling of the present disclosure can be applied to simple and efficient manufacturing of various shape forming objects and structures and also particularly suitably applied to the kit for 3D modeling, the method of manufacturing a 3D object for 3D modeling, the method of manufacturing a green body for 3D modeling, the device for manufacturing a 3D object for 3D modeling, and the device for manufacturing a green body for 3D modeling of the present disclosure described later.

Kit for 3D Modeling

The kit for 3D modeling of the present disclosure contains the powder material for 3D modeling of the present disclosure, a solution that contains a solvent to dissolve the resin which covers the base particle, and other optional components.

Modeling Liquid

The modeling liquid contains a solvent to dissolve the resin which covers the base particle, preferably a cross-linking agent, and other optional components.

Solvent

As the solvent, no particular limit is applied as long as the solvent (medium) can dissolve the resin covering the base particle. Specific examples thereof include, but are not limited to, aqueous media such as water, ethers of alcohols such as ethanol, and ketones, aliphatic hydrocarbons, ether-based solvents such as glycol ether, ester-based solvents such as ethylacetate, ketone-based methyl ethyl ketone, and higher alcohols. Of these, water is preferable. As the water, deionized water, ultrafiltered water, reverse osmosis water, distilled water, pure water, and ultra pure water can be used. If water is used as the solvent of the modeling liquid, thickening of the solvent is avoided when the solvent dries, which is preferable in terms that defective discharging does not occur even when the material is applied to an inkjet method.

Cross-Linking Agent

By applying the modeling liquid to the powder material for 3D modeling, the resin in the powder material for 3D modeling is dissolved in the solvent in the modeling liquid. Therefore, the base material particles adhere to each other as water serving as the solvent dries, so that a 3D object is formed. While forming the object, if the modeling liquid contains a cross-linking agent, a cross-linking structure is formed with the resin, thereby further improving the strength of the obtained 3D object. The cross-linking agent has no particular limit, for example, the agent capable of conducting cross-linking reaction with the functional group of a resin is suitable. It is preferable to select an agent from organic metal salts to a particular application.

Examples of the organic metal salts are metal complexes, zirconia-based cross-linking agents, titanium-based cross-linking agents, water soluble organic cross-linking agents, and chelating agents. Specific examples of the zirconia-based cross-linking agents include, but are not limited to, zirconium oxychloride and ammonium zirconium carbonate. Specific examples of the titanium-based cross-linking agents include, but are not limited to, titanium acylate and titanium alkoxide.

Specific examples of the chelating agents include, but not limited to, organic titanium chelate and organic zirconium chelate. These can be used alone or in combination.

Furthermore, organic metal salts that ionize cation metal having di- or higher valent in water are preferable. Specific examples of the organic metal salts include, but are not limited to, zirconium oxychloride octahydrate (quadrivalent), titanium lactate ammonium salt (quadrivalent), aluminum subacetate (trivalent), ammonium salt of zirconium carbonate (quadrivalent), titanium triethanol aminate (quadrivalent), glyoxyl acid salts, and zirconium lactate ammonium salts.

In addition, these are available on market. Specific examples of such products include, but are not limited to, zirconium oxychloride octahydrate (acid zirconium chloride, manufactured by DAIICHI KIGENSO KAGAKU KOGYO Co., LTD.), titanium lactate ammonium salts (Orgatix TC-300, manufactured by Matsumoto Fine Chemical Co. Ltd.), zirconium lactate ammonium salts (Orgatix ZC-300, manufactured by Matsumoto Fine Chemical Co. Ltd.), aluminum subacetate (manufactured by Wako Pure Chemical Industries, Ltd.), carboxylic acid zirconium oxide ammonium salt (Zircosol AC-20, manufactured by DAIICHI KIGENSO KAGAKU KOGYO CO., LTD.), and titanium triethanol aminate (Orgatix TC-400, manufactured by Matsumoto Fine Chemical Co. Ltd.). When the degree of valent of the metal in the organic metal salt mentioned above is di- or higher, it is possible to improve the cross-linking strength so that a thus-obtained 3D object has desired strength.

It is preferable that the organic metal salt should have a ligand. In addition, as the ligand of the cation metal, lactic acid ion is preferable in terms of discharging stability (storage property over time) of the modeling liquid. When the ligand of the cation metal is a carboxylic acid ion, for example, carboxylic acid zirconium ammonium, self polymerization reaction occurs in an aqueous solution, so that the property of a cross linking agent tends to change. Therefore, in terms of discharging stability, it is preferable to use a cross-linking agent having lactic acid ion as the ligand of the cation. However, by adding a chelating agent such as gluconic acid and triethanol amine, self polymerization reaction of carboxylic acid zirconium ammonium in an aqueous solution can be subdued, thereby improving discharging stability.

The content (concentration) of the cross-linking agent is not particularly limited and can be suitably determined to a particular application. The concentration of from 0.1 parts by mass (percent by mass) to 50 parts by mass (percent by mass) to 100 parts by mass of the resin is preferable. The concentration of from 0.5 part by mass (percent by mass) to 40 parts by mass (percent by mass) to 100 parts by mass of the resin is more preferable. The concentration of from 1 part by mass (percent by mass) to 35 parts by mass (percent by mass) to 100 parts by mass of the resin is particularly preferable.

Other Components

Examples of the other optional components are fluidity adjusters, surfactants, preservatives, antiseptic agents, stabilizing agents, pH regulators, water soluble solvents, and wetting agents.

Since the kit for 3D modeling of the present disclosure can be suitably used for various shape-forming objects and structures. The kit can be particularly suitably applied to the method of manufacturing a 3D object of the present disclosure, the device for manufacturing a 3D object of the present disclosure, and the 3D object obtained in the present disclosure.

Three-Dimensional (3D) Object

The three-dimensional (3D) object obtained in the present disclosure is a cured object obtained by applying the modeling liquid to the powder material for 3D modeling of the present disclosure or a cured object obtained by applying the modeling to the powder material for 3D modeling in the kit for 3D modeling of the present disclosure and is used as a cured object for sintering to manufacture an object (sintered compact of the 3D object) by sintering.

The 3D object is obtained by simply applying the modeling liquid to the powder material for 3D modeling but has a sufficient strength.

In the 3D object, the base particles are densely (high filling rate) present and only a very minute amount of the resin is present around the base particles. Therefore, when a sintered object (sintered compact) is obtained by sintering after manufacturing the 3D object, unlike a typical cured object of powder or particle obtained by using an adhesive, etc., unnecessary voids (marks of removed grease), etc. are not present since the amount of volatile organic component (removal of grease) is reduced. As a consequence, the sintered compact has a beautiful appearance.

Unless the grease is completely removed, the carbon component deriving from a resin remains in the sintered compact so that the composition changes from the raw material thereof. Accordingly, removal of grease takes a long time in a typical method. To the contrary, the amount of a resin is extremely small in the present disclosure. This obviates the need for a furnace specialized for removal of grease. Therefore, it is possible to obtain a sintered compact having the same composition as the raw material thereof by complete removal of grease in a short time.

The strength of the 3D object is, for example, such that no losing shape, etc. is caused by abrading the surface or no cracking occurs when the object is subject to air blow treatment using an air gun having a nozzle diameter of 2 mm and an air pressure of 0.3 MPa at 5 cm away from the object.

Green Body for 3D Modeling

The green body for 3D modeling of the present disclosure is obtained by adding a step of curing and drying a cured object obtained by applying the modeling liquid to the powder material for 3D modeling to the method of manufacturing the 3D object.

The green body for 3D modeling includes a base material and a resin covering the base material, wherein the resin has a first absorption peak in a range of from 1,141 $cm^{-1}$ to 1,145 $cm^{-1}$ and a second absorption peak in a range of from 1,089 $cm^{-1}$ to 1,093 $cm^{-1}$ in an infrared absorption spectrum and an intensity ratio of the first absorption peak to the second absorption peak is from 0.55 to 0.80.

The present inventors have found that a green body and a sintered compact for 3D modeling having a sufficient strength with high accuracy can be obtained by limiting the absorption peak intensity rate of the resin contained in the green body within the range of from 0.55 to 0.80.

In general, the green body represents an article obtained by simply hammering powder for solidification or injection molding a compound being a kneaded material of powder and a binder. The green body of the present disclosure is manufactured in the following manner.

First, by rapid prototype (RP) 3D modeling method laminating layers of particles coated with a resin, predetermined areas corresponding to the layers of a 3D object to be manufactured are wet by a modeling liquid. The particles are caused to be wet in the wet areas by the modeling liquid so that these are attached and combined.

Subsequent to the evaporation and drying process of the solvent in the modeling liquid, the particles are further directly attached to each other to form the green body of the present disclosure. That is, the green body is an article before being sintered, that is, unsintered compact.

Method of Manufacturing 3D Object and Device for Manufacturing 3D Object

The method of manufacturing a 3D object of the present disclosure includes a step of forming a powder material layer, a step of applying a modeling liquid containing a solvent to dissolve the resin mentioned above to a particular area of the powder material layer, and other optional steps such as sintering. The step of forming a powder material layer and the step of applying a modeling liquid are repeated to form a 3D object.

The steps of forming the powder material layer and applying a modeling liquid containing a solvent to dissolve the resin mentioned above to a particular area of the powder material layer are repeated to manufacture a 3D object. The device for manufacturing a 3D object of the present disclosure includes a powder material layer forming device and a modeling liquid applying device. The device for manufacturing a 3D object preferably has a powder material containing unit and a modeling liquid containing unit with other optional devices such as a curing device, a drier, a modeling liquid supplier, and a sintering device.

The method of manufacturing a green body for 3D modeling of the present disclosure includes a step of forming a powder material layer, a step of applying a modeling liquid containing a solvent to dissolve the resin mentioned above to a particular area of the powder material layer, and optionally a step of curing and drying binding powder particles, and other optional steps such as sintering. The steps of forming a powder material layer and the applying a modeling liquid are repeated to manufacture the green body.

The steps of forming the powder material layer and applying a modeling liquid containing a solvent to dissolve the resin mentioned above to a particular area of the powder material layer are repeated and the step of curing and drying is also included to manufacture a 3D object. The device for manufacturing a green body for 3D modeling of the present disclosure includes a powder material layer forming device and a modeling liquid applying device. The device for manufacturing a green body preferably has a powder material containing unit and a modeling liquid containing unit with other optional devices such as a curing device, a drying device, a modeling liquid supplier, and a sintering device.

Powder Material Layer Forming Step and Powder Material Layer Forming Device

The powder material layer forming step forms a powder material layer for 3D modeling on a substrate by using the powder material for 3D modeling of the present disclosure. The powder material layer forming device forms a layer of the powder material for 3D modeling of the present disclosure on a substrate.

Substrate

The substrate is not particularly limited. Preferably, such a substrate can place the powder material for 3D modeling thereon. For example, a known platform or base plate having a surface on which the powder for 3D modeling is placed is suitably used. The surface of the substrate, that is, the surface on which the powder material for 3D modeling is placed may be smooth, coarse, plane, or curved plane. It is preferable that the surface has a low affinity with the resin when the resin in the powder material for 3D modeling is dissolved. If the affinity of the surface with the dissolved resin is lower than that of the base particle with the dissolved resin, it is easy to take the obtained 3D object out of the surface.

Forming Powder Material Layer

The method of placing the powder for 3D modeling on the substrate is not particularly limited. For example, a method using a known counter rotation mechanism (counter roller) for use in a selective laser sintering method, a method of extending the powder for 3D modeling to a thin layer using a member such as a brush, a roller, and a blade, a method of pressing the surface of the powder for 3D modeling using a pressure member to extend the powder for 3D modeling to a thin layer, and a method of using a known powder additive manufacturing device (device for manufacturing a 3D object) are suitable as the method of placing the powder for 3D modeling in a thin layer.

Using the counter rotation mechanism (counter roller), the brush, the blade, or the pressing member, a thin layer of the powder material for 3D modeling can be formed on a substrate, for example, in the following manner. In an outer frame (also referred to as "form", "hollow cylinder" "tubular structure", etc.), the powder material for 3D modeling is placed by the counter rotation mechanism (counter roller), the brush, the blade, the pressing member, etc. onto the substrate arranged to move up and down slidably along the inside wall of the outer frame. At this point, to use a substrate movable up and down in the outer frame, the substrate is positioned to be slightly lower than the upper open mouth of the outer frame. That is, while placing the substrate with a layer thickness of the powder material for 3D modeling below the open mouth, the powder material for 3D modeling is placed on the substrate. A thin layer of the powder material for 3D modeling is thus-placed on the substrate.

By applying the modeling liquid to the thin layer of the powder for 3D modeling placed on the substrate in such a manner, the resin covering the base particle in the powder material for 3D modeling is dissolved in the modeling liquid in the modeling liquid. Therefore, the base particles adhere to each other as water serving as the solvent dries. Consequently, the thin layer is formed. The powder material for 3D modeling is placed on the thus-obtained thin layer in the same manner as described above and thereafter, when the modeling liquid is applied to the powder material layer on the thin layer, the resin covering the base particle is dissolved to form a resin-dissolution layer. The dissolution at this point of time occurs not only to the powder material layer formed on the thin layer but also to the border between the powder material layer and the thin layer that is already formed and present below the powder material layer. As a consequence, a 3D object is obtained which has a thickness corresponding to approximately two layers of the powder material for 3D modeling placed on the thin layer.

In addition, it is possible to automatically and simply place a thin layer of the powder material for 3D modeling on the substrate by using the known 3D modeling device described above. A typical powder material laminating (layer forming) device has a recoater to laminate the powder material for 3D modeling, a movable supplying tank to supply the powder material for 3D modeling onto the substrate, and a movable modeling tank to form a thin layer of the powder material for 3D modeling and laminate the thin layers. In the powder material layer forming device, the surface of the supplying tank can be elevated slightly above the surface of the modeling tank by moving up the supplying tank, moving down the modeling tank, or both. In addition, the powder material for 3D modeling is arranged to form a thin layer using the recoater from the side of the supplying tank and in addition, by repeating moving the recoater, the thin layers of the powder material for 3D modeling are laminated.

The thickness of the powder material layer for 3D modeling is not particularly limited. For example, the average thickness of a single layer is preferably from 30 µm to 500 µm and more preferably from 60 µm to 300 µm.

When the thickness is 30 µm or greater, the strength of the 3D object of the powder material (layer) for 3D modeling formed by applying the modeling liquid to the powder material for 3D modeling is sufficient, which makes it free from problems such as losing shape during processing such as sintering conducted after forming the layer. When the thickness is 500 µm or less, the dimension accuracy of the 3D object of the powder material (layer) for 3D modeling formed by applying the modeling liquid to the powder material for 3D modeling is improved. In addition, grease can be removed in a short time.

Incidentally, the average thickness has no particular limit and can be measured according to a known method.

Powder Material Layer Curing Step and Modeling Liquid Applying Device

The powder material layer curing step includes curing a particular area after applying a modeling liquid containing a solvent that dissolves the resin to the particular area of the powder material layer for 3D modeling formed in the step of forming the powder material layer. Curing proceeds by a drying step including evaporation of the solvent component in the modeling liquid and heating after the application of the modeling liquid. The modeling liquid applying device applies a modeling liquid containing a solvent that dissolves the resin covering the base particle to dissolve a particular area of the powder material layer for 3D modeling formed by the powder material layer forming device.

The method of applying the modeling liquid to the powder material layer is not particularly limited and can be selected to a particular application. For example, a dispenser method, a spray method, or an inkjet method is suitable. To execute such a method, a known device is suitably used as the modeling liquid applying device. Of these, the dispenser method has an excellent quantitative property but the application area is small. The spray method is capable of simply forming a fine discharging material, has a wide application area, and demonstrates excellent applicability but the quantitative property thereof is poor so that powder material scatters due to the spray stream. For this reason, in the present disclosure, the inkjet method is particularly preferable. The inkjet method has a good quantitative property in comparison with the spray method and a wider application area in comparison with the dispenser method. Accordingly, the inkjet method is preferable to accurately and efficiently form a complex shape.

When utilizing the inkjet method, the modeling liquid applying device has a nozzle to apply the modeling liquid to the powder material layer by the inkjet method. As the nozzle, nozzles (discharging head) in the known inkjet printers can be suitably used. In addition, it is possible to use the inkjet printer as the modeling liquid applying device. A preferred specific example of the inkjet printer is SG7100, manufactured by Ricoh Company Ltd. It is preferable to use the inkjet printer because the head portion can drip a large amount of the modeling liquid at once and the application area is large, which leads to improvement of high application performance.

In the present disclosure, even when an inkjet printer is used to accurately and efficiently apply the modeling liquid, the nozzles and the head of the nozzles are free of clogging or corrosion since the modeling liquid contains no solid material such as particles or highly viscous polymer such as a resin. In addition, when the modeling liquid is applied onto the powder material layer for 3D modeling, it efficiently permeates into the resin in the powder material for 3D modeling. Accordingly, the efficiency of manufacturing a 3D object is excellent and an unexpected volume increase can be avoided since polymer components such as resins are not applied. Consequently, a 3D object having a good dimension accuracy can be easily and efficiently obtained in a short time.

The cross-linking agent can also serve as a pH regulator in the modeling liquid. When the modeling liquid is applied to the powder material layer for 3D modeling according to the inkjet method, the pH of the modeling liquid is preferably from 5 (weak acidity) to 12 (basic) and more preferably from 8 to 10 (weak basic) in terms of prevention of clogging and corrosion of nozzle head portions of nozzles to be used. To regulate the pH, known pH regulators may be used.

Powder Material Containing Unit

The powder material containing unit (container) contains the powder material for 3D modeling. The size, forms, materials, etc. thereof are not particularly limited. For example, a storage tank, a bag, a cartridge, or a tank is suitably selected to a particular application.

Modeling Liquid Containing Unit (Container)

The modeling liquid containing unit (container) contains the modeling liquid. The size, form, material, etc. thereof are not particularly limited. For example, a storage tank, a bag, a cartridge, or a tank is suitably selected to a particular application.

Other Processes

The other processes include a drying process, a sintering process, a surface protection treatment process, a coating (application) process, etc.

The drying process is to dry a cured object (3D object) obtained in the powder material layer curing process. In the drying process, not only water contained in the cured object but also organic materials may be removed (degreasing). By a suitable drying device, the strength and anti-humidity of the cured object (3D object) are improved to obtain a green body for 3D modeling of the present disclosure. For example, known driers can be used as the drying device.

The sintering process is to degrease and sinter a cured material (3D object) formed in the step of curing the powder material layer. According to these degreasing and sintering processes, the cured object (sintered compact of 3D object) is made as an integrated shape-forming object (sintered compact of the 3D modeling) of metal or ceramic. For example, a known sintering furnace under temperature control can be used as the sintering device.

The surface protection treatment process is to form a protection layer on a cured object (3D object) formed in the step of curing the powder material layer. By executing the surface protection treatment process, the surface of the cured object (3D object) has durability to a degree that, for example, the object can be used as is. Specific examples of the protection layer include, but are not limited to, a water-resistance layer, a weather resistance layer, a light resistance layer, a heat insulation layer, and a gloss layer. Specific examples of the surface protection treatment device include, but are not limited to, known surface protection treatment devices such as a spraying device and a coating device.

The coating step is to conduct coating for a cured object (3D object) formed in the step of curing the powder material layer. By the coating process, the cured object (3D modeling) is colored in a desired color. Specific examples of the coating device include, but are not limited to, known coating devices using a spray, a roller, a brush.

FIG. 1 is a diagram illustrating an example of the device for manufacturing a 3D object of the present disclosure. The device for manufacturing a 3D object illustrated in FIG. 1 includes a powder material storage tank 1 on the 3D modeling side and a powder storage tank 2 on the powder supplying side. Each of these powder material storage tanks has a stage 3 movable up and down and places the powder material for 3D modeling on the stage 3 to form a thin layer formed of the powder material. The device for manufacturing a 3D object has an inkjet head 5 over the storage tank 1 to discharge a modeling liquid 4 toward the powder material for 3D modeling in the powder storage tank 1. Moreover, the device for manufacturing a 3D object supplies the powder material for 3D modeling from the powder storage tank 2 to the powder storage tank 1 and also has a recoating mechanism (hereinafter referred to as recoater) 6 to smooth the surface of the powder material (layer) for 3D modeling in the powder storage tank 1.

The modeling liquid 4 is dripped from the inkjet head 5 onto the powder material layer for 3D modeling of the powder storage tank 1. At this point in time, the position where the modeling liquid 4 is dripped is determined by two-dimensional image data (slice data) obtained by slicing a desired 3D shape into multiple plane layers. After completing depiction corresponding to an amount of a single layer, the stage 3 for the powder storage tank 2 is elevated while the stage 3 for the storage tank 1 is lowered. The amount of the powder material for 3D modeling corresponding to the difference is moved to the powder storage tank 1 by the recoater 6.

This is how a new layer of the powder material for 3D modeling is formed on the surface of the depicted powder material layer for 3D modeling. The single layer of the powder material for 3D modeling has a thickness of from 30 μm to 500 μm. Furthermore, depiction is conducted on the newly-formed powder material layer for 3D modeling based on slice data for the second layer (new layer). A series of these processes are repeated to obtain a 3D object. Subsequent to heating and drying by a heater, a final 3D object is obtained.

Figure 2:
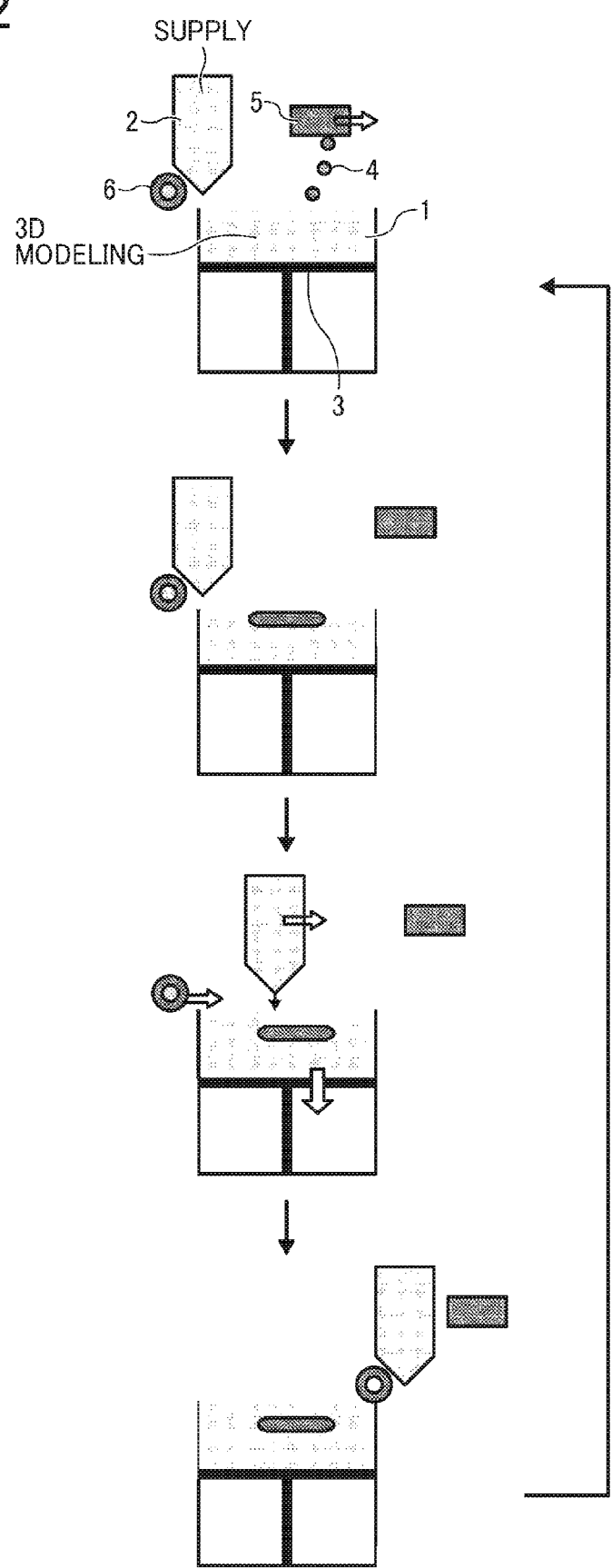
FIG. 2 is a schematic diagram illustrating another example of the device for manufacturing a 3D object according to an embodiment of the present invention.

FIG. 2 is a diagram illustrating another example of the device for manufacturing a 3D object of the present disclosure. The device for manufacturing a 3D object illustrated in FIG. 2 operates on the same principle as that illustrated in FIG. 1. However both have different supplying mechanisms. That is, the powder storage tank 2 is disposed over the powder storage tank 1. When the depiction of the first layer is finished, the stage 3 of the powder storage tank 1 is lowered in a predetermined amount and the powder material for 3D modeling is dropped from the powder storage tank 2 to the powder storage tank 1 while moving the powder storage tank 2 to form a new powder layer for 3D modeling. Thereafter, the recoater 6 compresses the powder material layer for 3D modeling to increase the bulk density and also smooth the height of the powder material layer for 3D modeling. According to the device for manufacturing a 3D object illustrated in FIG. 2, the configuration of the device is compact in comparison with the configuration illustrated in FIG. 1 in which the two powder storage tanks are disposed side by side.

According to the method of manufacturing a 3D object and a green body of the present disclosure and the device for manufacturing a 3D object and a green body of the present disclosure, a 3D object having a complex form and a sufficient strength with a high level of safety and good dimension accuracy can be simply and efficiently manufactured without losing shape before sintering, etc., by using the powder material for 3D modeling of the present disclosure or the kit for 3D modeling of the present disclosure. Since each of the thus-obtained 3D modeling object and green body, and a sintered compact thereof has a sufficient strength and excellent dimension accuracy, representing fine roughness and curved planes, the object has aesthetic aspect with high quality and can be suitably used for various purposes.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Manufacturing examples of 3D objects are described in the following Examples.

Example I-1

Preparation of Powder Material I-1 for 3D Modeling

Preparation of Coating Liquid 1

114 parts by mass of deionized water was mixed with 6 parts by mass of diacetone acrylamide-modified polyvinyl alcohol (DF-05, average degree of polymerization: 500, manufactured by JAPAN VAM & POVAL CO., LTD.). The mixture was stirred for one hour using a general purpose agitator BL600 (manufactured by SHINTO Scientific Co., Ltd.) while being heated at 80 degrees C. in a water bath to dissolve diacetone acrylamide-modified polyvinyl alcohol. As a result, 120 parts by mass of an aqueous solution of 5 percent by mass diacetone acrylamide-modified polyvinyl-alcohol was obtained. The thus-manufactured preparation liquid was referred to as [Coating liquid I-1].

Coating of Coating Liquid I-1 to Surface of Base Material

Using a coating device (MP-01, manufactured by POW-REX CORPORATION) available on market, 100 parts by mass of powder of stainless steel SUS316L (PSS316L, volume average particle diameter: 41 µm, manufactured by Sanyo Special Steel Co., Ltd.) serving as a base particle was coated with [Coating liquid I-1] under the following coating conditions in such a manner that the coverage thickness was 300 nm to obtain [Powder material I-1 for 3D modeling] having a volume average particle diameter of 43 µm (evaluation device: Microtrac HRA, manufactured by NIKKISO CO., LTD.).

Coating Conditions
 Spray Setting
  Nozzle diameter: 1.2 mm
  Coating liquid discharging pressure: 4 Pa·s to 5 Pa·s
  Coating liquid discharging speed: 3 g/min.
  Atomize air amount: 40 NL/min to 50 NL/min
 Rotor Setting
  Rotation speed: 60 rpm
  Number of rotation: 400 percent
 Air Stream Setting
  Air supply temperature: 85 degrees C.
  Air supply amount: 0.8 m$^3$/min.
  Bug filter shaking pressure: 0.2 MPa
  Bug filter shaking time: 0.3 seconds
  Bug filter interval: 5 seconds
  Coating Time: 80 Minutes The coverage thickness was measured as follows:

Coverage Thickness

A sample for observation was prepared by polishing the surface of [Powder I-1 for 3D modeling] with emery paper and thereafter slightly polishing the surface with a wet cloth to dissolve the resin portion. Next, the border between the base portion and the resin portion exposed to the surface was observed by a field-emission-type scanning electron microscope (FE-SEM) and the length between the surface of the resin portion and the border was measured as the coverage thickness. Thereafter, the average of ten measured points was obtained and determined as the coverage thickness (average thickness).

Infra-Red Absorption Spectrum

The infra-red absorption spectrum described in the present disclosure was measured by FTIR Avatar 370, manufactured by Thermo Nicolet Co.). The background was measured to erase the background information and thereafter the powder material for 3D modeling was lined on dispersive elements to measure the infra-red absorption spectrum while pressing the powder material with a glass slide, etc. according to an attenuated total reflection (ATR) method. The number of quantity survey was 20 to obtain measuring data. The peak intensity ratio was calculated based on the data of absorbance (refer to FIG. 3).

Preparation of Modeling Liquid 70 parts of water and 30 parts of 3-methyl-1,3-butane diol (manufactured by Tokyo Chemical Industry Co. Ltd.) serving as a fluidity adjusting agent were mixed and stirred to obtain a modeling liquid.

Three-Dimensional (3D) Object

[3D object 1] was manufactured with the thus-obtained [Powder I-1 for 3D modeling] and the modeling liquid in the following manner using a form print pattern having a size of 70 mm long×12 mm wide.

1. Process of Forming Thin Layer

Using a known powder material laminating device as illustrated as in FIG. 1, [Powder material I-1 for 3D modeling] was transferred from the powder supplying tank to the 3D modeling tank to form a thin layer of [Powder material I-1 for 3D modeling] having an average thickness of 100 μm on a substrate.

2. Process of Attaching Base Particle

Next, the modeling liquid was applied (discharged) to the surface of the formed thin layer of [Powder material 1-1 for 3D modeling] to dissolve the resin covering the base particles to cause the base particles to adhere to each other.

3. Drying Process

3. Thereafter, repeating the steps 1 and 2 described above, the thin layer of [Powder material I-1 for 3D modeling] was sequentially laminated to obtain a laminate 3D object having an average thickness of 3 mm. Thereafter, using a drier, the 3D object was dried at 50 degrees C. for four hours and thereafter 100 degrees C. for 12 hours to obtain [3D object 1].

Losing shape did not occur to the thus-obtained [3D object 1] when extra [Powder material 1 for 3D modeling] was removed by air blow.

[3D object 1] was evaluated with regard to bend stress and dimension accuracy in the following manner.

Bend Stress

Three-point bend stress of [3D object 1] was measured to obtain the intensity (hardness) thereof using a device (Autograph AGS-J, manufactured by Shimadzu Corporation) and a three-point bend test jig (plastic). The bend stress was evaluated according to the following criteria.

Evaluation Criteria

A: 8.0 MPa or more
B: 5.0 MPa to less than 8.0 MPa
C: 3.0 MPa to less than 5.0 MPa
D: Less than 3.0 MPa Dimension Accuracy D: Surface of obtained 3D object distorted. Base material and organic material locally present by observation of surface
C: Surface of obtained 3D object slightly distorted and roughened
B: State of surface of obtained 3D object was good with slight warp
A: Obtained 3D object having smooth and beautiful surface with no warp Manufacturing of Sintered Compact

[3D object 1] obtained in the step 3 described above was heated by a drier to 400 degrees in a nitrogen atmosphere for defatting. Furthermore, the resultant was subject to sintering treatment at 1,300 degrees C. in a sintering furnace in vacuum condition. As a result, [3D object (sintered object) 1] had an aesthetic surface. This sintered compact was a completely integrated stainless structure (metal lump) and not broken at all when slammed down on a hard floor.

Examples I-2 to I-4 and Comparative Example I-1

[Powder material I-2 for 3D modeling] to [Powder material I-5 for 3D modeling] were manufactured in the same manner as in Example I-1 except that the air supplying temperature condition in the coating condition was changed as shown in Table 1 to respectively manufacture and evaluate [3D object 2] to [3D object 5] in the same manner as in Example I-1.

Comparative Example I-2

[Powder material I-6 for 3D modeling] was manufactured in the same manner as in Example I-1 except that 100 parts of powder of stainless steel SUS316L (PSS316L, volume average particle diameter: 41 μm, manufactured by SANYO SPECIAL STEEL Co., Ltd.) and 5 parts of diacetone acrylamide-modified polyvinyl alcohol (DF-05, average degree of polymerization: 500, manufactured by JAPAN VAM & POVAL CO., LTD.) were stirred and mixed as the powder material for 3D modeling to manufacture and evaluate [3D object 6] in the same manner as in Example I-1.

Example I-5

[Powder material I-7 for 3D modeling] was manufactured in the same manner as in Example I-1 except that diacetone acrylamide-modified polyvinylalcohol (DF-05, average degree of polymerization: 500, manufactured by JAPAN VAM & POVAL CO., LTD.) was changed to carboxy group-modified polyvinyl alcohol (Gohsenx™ Z-100, average degree of polymerization: 500, manufactured by The Nippon Synthetic Chemical Industry Co., Ltd.) to manufacture and evaluate [3D object 7] in the same manner as in Example I-1.

Example I-6

[Powder material I-8 for 3D modeling] was manufactured in the same manner as in Example I-5 except that carboxy group-modified polyvinyl alcohol (Gohsenx™ Z-100, average degree of polymerization: 500, manufactured by The Nippon Synthetic Chemical Industry Co., Ltd.) was changed to carboxy group-modified polyvinyl alcohol (Gohsenx™ Z-200, average degree of polymerization: 1000, manufactured by The Nippon Synthetic Chemical Industry Co., Ltd.) to manufacture and evaluate [3D object 8] in the same manner as in Example I-1.

Examples I-7 to I-9 and Comparative Example I-3

[Powder material I-9 for 3D modeling] to [Powder material I-12 for 3D modeling] were manufactured in the same manner as in Example I-5 except that the air supplying temperature condition in the coating condition was changed as shown in Table 1 to respectively manufacture and evaluate [3D object 9] to [3D object 12] in the same manner as in Example I-1.

Example I-10

[3D object 13] was manufactured in the same manner as in Example I-5 except that 5 parts of ammonium salt of zirconium carbonate (Zircosol AC-20, manufactured by DAIICHI KIGENSO KAGAKU KOGYO CO., LTD.) serving as cross linking agent was admixed and dissolved in the modeling liquid used during manufacturing of 3D object to evaluate [3D object 13] in the same manner as in Example I-1.

Example I-11

[3D object 14] was manufactured in the same manner as in Example I-5 except that 5 parts of ammonium salt of zirconium lactate (Orgatix ZC 300, manufactured by Matsumoto Fine Chemical Co. Ltd.) serving as cross linking agent was admixed and dissolved in the modeling liquid used during manufacturing of 3D object to evaluate [3D object 14] in the same manner as in Example I-1.

Comparative Example I-4

[Powder material I-13 for 3D modeling] was manufactured in the same manner as in Example I-1 except that 100 parts of powder of stainless steel SUS316L (PSS316L, volume average particle diameter: 41 μm, manufactured by SANYO SPECIAL STEEL Co., Ltd.) and 5 parts of carboxy group-modified polyvinyl alcohol (Gohsenx™ Z-100, average degree of polymerization: 500, manufactured by The Nippon Synthetic Chemical Industry Co., Ltd.) were stirred and mixed as the powder material for 3D modeling to manufacture and evaluate [3D object 15] in the same manner as in Example I-1.

Example I-12

[Powder material I-14 for 3D modeling] was manufactured in the same manner as in Example I-1 except that diacetone acrylamide-modified polyvinylalcohol (DF-05, average degree of polymerization: 500, manufactured by JAPAN VAM & POVAL CO., LTD.) was changed to a copolymer of butanediol vinylalcohol (Nichigo G-Polymer™, OKS-1080, average degree of polymerization: 600, manufactured by The Nippon Synthetic Chemical Industry Co., Ltd.) to manufacture and evaluate [3D object 16] in the same manner as in Example I-1.

Example I-13

[Powder material I-15 for 3D modeling] was manufactured in the same manner as in Example I-12 except that the copolymer of butanediol vinylalcohol (Nichigo G-Polymer™, average degree of polymerization, manufactured by The Nippon Synthetic Chemical Industry Co., Ltd.) was changed to a copolymer of butanediol vinylalcohol (Nichigo G-Polymer™ OKS-8049, average degree of polymerization: 450, manufactured by The Nippon Synthetic Chemical Industry Co., Ltd.) to manufacture and evaluate [3D object 17] in the same manner as in Example I-1.

Examples I-14 to I-16 and Comparative Example I-5

[Powder material I-16 for 3D modeling] to [Powder material I-19 for 3D modeling] were manufactured in the same manner as in Example I-12 except that the air supplying temperature condition in the coating condition was changed as shown in Table 1 to respectively manufacture and evaluate [3D object 18] to [3D object 21] in the same manner as in Example I-1.

Comparative Example I-6

[Powder material I-20 for 3D modeling] was manufactured in the same manner as in Example I-1 except that 100 parts of powder of stainless steel SUS316L (PSS316L, volume average particle diameter: 41 μm, manufactured by SANYO SPECIAL STEEL Co., Ltd.) and 5 parts of a copolymer of butanediol vinylalcohol (Nichigo G-Polymer™ OKS-1080, average degree of polymerization: 600, manufactured by The Nippon Synthetic Chemical Industry Co., Ltd.) were stirred and mixed as the powder material for 3D modeling to manufacture and evaluate [3D object 22] in the same manner as in Example I-1.

Example I-17

[Powder material I-21 for 3D modeling] and [3D object 23] were manufactured in the same manner as in Example I-5 except that the base material was changed to alumina (AHP30, volume average particle diameter: 40 μm, manufactured by Nippon Light Metal Company, Ltd.). The thus-obtained [3D object 23] was evaluated in the same manner as in Example I-1.

Examples I-18 to I-20 and Comparative Example I-5

[Powder material I-22 for 3D modeling] to [Powder material I-25 for 3D modeling] were manufactured in the same manner as in Example I-17 except that the air supplying temperature condition in the coating condition was changed to respectively manufacture and evaluate [3D object 24] to [3D object 27] in the same manner as in Example I-1.

Comparative Example I-8

[Powder material I-26 for 3D modeling] was manufactured in the same manner as in Example I-1 except that 100 parts of alumina (AHP30, volume average particle diameter: 40 μm, manufactured by Nippon Light Metal Company, Ltd.) and 5 parts of carboxy group-modified polyvinyl alcohol (Gohsenx™ Z-100, average degree of polymerization: 500, manufactured by The Nippon Synthetic Chemical Industry Co., Ltd.) were stirred and mixed as the powder material for 3D modeling to manufacture and evaluate [3D object 28] in the same manner as in Example I-1.

Example I-21

[Powder material I-27 for 3D modeling] and [3D object 29] were manufactured in the same manner as in Example I-5 except that the base material was changed to zirconia (TZ-B53, volume average particle diameter: 50 μm, manufactured by TOSOH CORPORATION). The thus-obtained [3D object 29] was evaluated in the same manner as in Example I-1. The results are shown in Table 1.

Examples I-22 to I-24 and Comparative Example I-9

[Powder material I-28 for 3D modeling] to [Powder material I-31 for 3D modeling] were manufactured in the same manner as in Example I-21 except that the air supplying temperature condition in the coating condition was changed as shown in Table 1 to respectively manufacture and evaluate [3D object 30] to [3D object 33] in the same manner as in Example I-1.

Comparative Example I-10

[Powder material I-32 for 3D modeling] was manufactured in the same manner as in Example I-1 except that 100 parts of zirconia (TZ-B53, volume average particle diameter: 50 μm, manufactured by TOSOH CORPORATION) and 5 parts of carboxy group-modified polyvinyl alcohol (Gohsenx™ Z-100, average degree of polymerization: 500, manufactured by The Nippon Synthetic Chemical Industry Co., Ltd.) were stirred and mixed as the powder material for 3D modeling to manufacture and evaluate [3D object 34] in the same manner as in Example I-1.

Examples I-25 to I-30

[Powder material I-33 for 3D modeling] to [Powder material I-38 for 3D modeling] and [3D object 35] to [3D object 40] were manufactured in the same manner as in Example I-8 except that the coverage thickness of the coating liquid to the surface of the base material was changed as shown in Table 1. The thus-obtained [3D object 35] to [3D object 40] were evaluated in the same manner as in Example I-1. The results are shown in Table 1.

The evaluation results for the powder materials and the 3D objects manufactured in each Example and Comparative Example are shown in Table 1. The resins used to cover the base materials are represented by R1 to R5 in Table 1 and the materials and the product names of the resins R1 to R5 are shown in Table 2.

TABLE 1

| | 3D modeling No. | Powder material No. | Base material (particle) | Resin Symbol | Resin Product No. | Cross-linking agent | Thickness |
|---|---|---|---|---|---|---|---|
| Example I-1 | 1 | I-1 | Stainless steel | R1 | DF-05 | | 300 nm |
| Example I-2 | 2 | I-2 | Stainless steel | R1 | DF-05 | | 300 nm |
| Example I-3 | 3 | I-3 | Stainless steel | R1 | DF-05 | | 300 nm |
| Example I-4 | 4 | I-4 | Stainless steel | R1 | DF-05 | | 300 nm |
| Comparative Example I-1 | 5 | I-5 | Stainless steel | R1 | DF-05 | | 300 nm |
| Comparative Example I-2 | 6 | I-6 | Stainless steel | R1 | DF-05 | | 300 nm |
| Example I-5 | 7 | I-7 | Stainless steel | R2 | Z-100 | | 300 nm |
| Example I-6 | 8 | I-8 | Stainless steel | R3 | Z-200 | | 300 nm |
| Example I-7 | 9 | I-9 | Stainless steel | R2 | Z-100 | | 300 nm |
| Example I-8 | 10 | I-10 | Stainless steel | R2 | Z-100 | | 300 nm |
| Example I-9 | 11 | I-11 | Stainless steel | R2 | Z-100 | | 300 nm |
| Comparative Example I-4 | 12 | I-12 | Stainless steel | R2 | Z-100 | | 300 nm |
| Example I-10 | 13 | I-7 | Stainless steel | R2 | Z-100 | AC-20 | 300 nm |
| Example I-11 | 14 | I-7 | Stainless steel | R2 | Z-100 | ZC-300 | 300 nm |
| Comparative Example I-4 | 15 | I-13 | Stainless steel | R2 | Z-100 | | 300 nm |
| Example I-12 | 16 | I-14 | Stainless steel | R4 | G-1080 | | 300 nm |
| Example I-13 | 17 | I-15 | Stainless steel | R5 | G-8049 | | 300 nm |
| Example I-14 | 18 | I-16 | Stainless steel | R4 | G-1080 | | 300 nm |
| Example I-15 | 19 | I-17 | Stainless steel | R4 | G-1080 | | 300 nm |
| Example I-16 | 20 | I-18 | Stainless steel | R4 | G-1080 | | 300 nm |
| Comparative Example I-5 | 21 | I-19 | Stainless steel | R4 | G-1080 | | 300 nm |
| Comparative Example I-6 | 22 | I-20 | Stainless steel | R4 | G-1080 | | 300 nm |
| Example I-17 | 23 | I-21 | Alumina | R2 | Z-100 | | 300 nm |
| Example I-18 | 24 | I-22 | Alumina | R2 | Z-100 | | 300 nm |
| Example I-19 | 25 | I-23 | Alumina | R2 | Z-100 | | 300 nm |
| Example I-20 | 26 | I-24 | Alumina | R2 | Z-100 | | 300 nm |
| Comparative Example I-7 | 27 | I-25 | Alumina | R2 | Z-100 | | 300 nm |
| Comparative Example I-8 | 28 | I-26 | Alumina | R2 | Z-100 | | 300 nm |
| Example I-21 | 29 | I-27 | Zirconia | R2 | Z-100 | | 300 nm |
| Example I-22 | 30 | I-28 | Zirconia | R2 | Z-100 | | 300 nm |
| Example I-23 | 31 | I-29 | Zirconia | R2 | Z-100 | | 300 nm |
| Example I-24 | 32 | I-30 | Zirconia | R2 | Z-100 | | 300 nm |
| Comparative Example I-9 | 33 | I-31 | Zirconia | R2 | Z-100 | | 300 nm |
| Comparative Example I-10 | 34 | I-32 | Zirconia | R2 | Z-100 | | 300 nm |
| Example I-25 | 35 | I-33 | Zirconia | R2 | Z-100 | | 10 nm |
| Example I-26 | 36 | I-34 | Zirconia | R2 | Z-100 | | 90 nm |

TABLE 1-continued

| | | | | | | |
|---|---|---|---|---|---|---|
| Example I-27 | 37 | I-35 | Zirconia | R2 | Z-100 | 110 nm |
| Example I-28 | 38 | I-36 | Zirconia | R2 | Z-100 | 190 nm |
| Example I-29 | 39 | I-37 | Zirconia | R2 | Z-100 | 210 nm |
| Example I-30 | 40 | I-38 | Zirconia | R2 | Z-100 | 480 nm |

| | Processing condition | | | Evaluation on 3D object | | | Evaluation on sintered compact Appearance |
|---|---|---|---|---|---|---|---|
| | | Air supplying temp. (degrees C.) | Degreasing time (hour) | Evaluation IR peak intensity peak ratio | Bend stress | | |
| | Processing method | | | | Measuring value (Mpa) | Evaluation | Dimension accuracy |
| Example I-1 | Coating | 85 | 4 | 0.56 | 6.5 | B | B | B |
| Example I-2 | Coating | 50 | 4 | 0.44 | 8.1 | A | C | B |
| Example I-3 | Coating | 100 | 4 | 0.62 | 5.8 | B | B | B |
| Example I-4 | Coating | 120 | 4 | 0.66 | 4.5 | C | A | B |
| Comparative Example I-1 | Coating | 40 | 4 | 0.38 | 8.5 | A | D | B |
| Comparative Example I-2 | Mixing | — | — | 0.85 | 2 | D | D | B |
| Example I-5 | Coating | 85 | 4 | 0.65 | 6.5 | B | B | B |
| Example I-6 | Coating | 85 | 4 | 0.66 | 7 | B | B | B |
| Example I-7 | Coating | 40 | 4 | 0.45 | 8.1 | A | C | B |
| Example I-8 | Coating | 60 | 4 | 0.55 | 5.8 | B | B | B |
| Example I-9 | Coating | 105 | 4 | 0.68 | 4.2 | C | A | B |
| Comparative Example I-4 | Coating | 120 | 4 | 0.73 | 2.8 | D | B | B |
| Example I-10 | Coating | 85 | 4 | 0.65 | 8.5 | A | A | B |
| Example I-11 | Coating | 85 | 4 | 0.65 | 8.2 | A | A | B |
| Comparative Example I-4 | Mixing | — | — | 0.91 | 2 | D | D | B |
| Example I-12 | Coating | 85 | 4 | 0.52 | 6.5 | B | B | B |
| Example I-13 | Coating | 85 | 4 | 0.54 | 6.4 | B | B | B |
| Example I-14 | Coating | 60 | 4 | 0.44 | 8.1 | A | C | B |
| Example I-15 | Coating | 100 | 4 | 0.6 | 5.8 | B | B | B |
| Example I-16 | Coating | 120 | 4 | 0.64 | 4.5 | C | A | B |
| Comparative Example I-5 | Coating | 50 | 4 | 0.38 | 8.5 | A | D | B |
| Comparative Example I-6 | Mixing | — | — | 0.81 | 2 | D | D | B |
| Example I-17 | Coating | 85 | 4 | 0.65 | 6.7 | B | B | B |
| Example I-18 | Coating | 40 | 4 | 0.45 | 8.3 | A | C | B |
| Example I-19 | Coating | 60 | 4 | 0.55 | 6 | B | B | B |
| Example I-20 | Coating | 105 | 4 | 0.68 | 4.6 | C | A | B |
| Comparative Example I-7 | Coating | 120 | 4 | 0.73 | 2.8 | D | B | B |
| Comparative Example I-8 | Mixing | — | — | 0.91 | 2.2 | D | D | B |
| Example I-21 | Coating | 85 | 4 | 0.65 | 6.2 | B | B | B |
| Example I-22 | Coating | 40 | 4 | 0.45 | 8 | A | C | B |
| Example I-23 | Coating | 60 | 4 | 0.55 | 5.5 | B | B | B |
| Example I-24 | Coating | 105 | 4 | 0.68 | 4.2 | C | A | B |
| Comparative Example I-9 | Coating | 120 | 4 | 0.73 | 2.8 | D | B | B |
| Comparative Example I-10 | Mixing | — | — | 0.91 | 2 | D | D | B |
| Example I-25 | Coating | 60 | 0.2 | 0.55 | 4 | C | B | B |
| Example I-26 | Coating | 60 | 1.1 | 0.55 | 4.8 | B | B | B |
| Example I-27 | Coating | 60 | 1.5 | 0.55 | 5 | B | A | A |
| Example I-28 | Coating | 60 | 2.5 | 0.55 | 5.4 | B | A | A |
| Example I-29 | Coating | 60 | 2.9 | 0.55 | 5.6 | B | B | B |
| Example I-30 | Coating | 60 | 6.5 | 0.55 | 6.1 | B | C | C |

AC-20: Zircosol AC-20, manufactured by DAIICHI KIGENSO KAGAKU KOGYO CO., LTD.)
ZC-300: Orgatix ZC-300, manufactured by Matsumoto Fine Chemical Co. Ltd.)

TABLE 2

| Resin No. | Resin name (Product No.) |
|---|---|
| R1 | Diacetone acrylamide-modified polyvinyl alcohol (DF-05, average degree of polymerization: 500, manufactured by JAPAN VAM & POVAL CO., LTD. |
| R2 | Carboxy group-modified polyvinyl alcohol (Gohsenx ™ Z-100, average degree of polymerization: 500, manufactured by The Nippon Synthetic Chemical Industry Co., Ltd. |

TABLE 2-continued

| Resin No. | Resin name (Product No.) |
|---|---|
| R3 | Carboxy group-modified polyvinyl alcohol (Gohsenx ™ Z-200, average degree of polymerization: 1000, manufactured by The Nippon Synthetic Chemical Industry Co., Ltd.) |
| R4 | Copolymer of butanediol vinylalcohol (Nichigo G-Polymer ™, OKS-1080, average degree of polymerization: 600, manufactured by The Nippon Synthetic Chemical Industry Co., Ltd.) |
| R5 | Copolymer of butanediol vinylalcohol (Nichigo G-Polymer ™ OKS-8049, average degree of polymerization: 450, manufactured by The Nippon Synthetic Chemical Industry Co.. Ltd.) |

Manufacturing examples of green bodies are described in the following Examples.

Example II-1

Preparation of Powder Material II-1 for 3D Modeling

Preparation of Coating Liquid II-1

114 parts by mass of deionized water was mixed with 6 parts of diacetone acrylamide-modified polyvinyl alcohol (DF-05, average polymerization degree: 500, manufactured by JAPAN VAM & POVAL CO., LTD.). The mixture was stirred for one hour using a general purpose agitator BL600 (manufactured by SHINTO Scientific Co., Ltd.) while being heated at 80 degrees C. in a water bath to dissolve diacetone acrylamide-modified polyvinyl alcohol. As a result, 120 parts by mass of an aqueous solution of 5 percent by mass diacetone acrylamide-modified polyvinyl alcohol was obtained. The thus-obtained coating liquid was referred to as [Coating liquid II-1].

Coating of Coating Liquid II-1 to Surface of Base Material

Using a coating device (MP-01, manufactured by POWREX CORPORATION) available on market, 100 parts by mass of powder of stainless steel SUS316L (PSS316L, volume average particle diameter: 41 μm, manufactured by Sanyo Special Steel Co., Ltd.) serving as a base particle was coated with [Coating liquid 1] under the following coating conditions in such a manner that the coverage thickness was 300 nm to obtain [Powder material II-1 for 3D modeling] having a volume average particle diameter of 43 μm (evaluation device: Microtrac HRA, manufactured by NIKKISO CO., LTD.).

Coating Conditions

Spray Setting

Nozzle diameter: 1.2 mm

Coating liquid discharging pressure: 4 Pa·s to 5 Pa·s

Coating liquid discharging speed: 3 g/min.

Atomize air amount: 40 NL/min to 50 NL/min

Rotor Setting

Rotation speed: 60 rpm

Number of rotation: 400 percent

Air Stream Setting

Air supply temperature: 80 degrees C.

Air supply amount: 0.8 m³/min.

Bug filter shaking pressure: 0.2 MPa

Bug filter shaking time: 0.3 seconds

Bug filter interval: 5 seconds

Coating Time: 80 Minutes

The coverage thickness was measured as follows:

Coverage Thickness

A sample for observation was prepared by polishing the surface of the powder II-1 for 3D modeling with emery paper and thereafter slightly polishing the surface with a wet cloth to dissolve the resin portion. Next, the border between the base portion and the resin portion exposed to the surface was observed by a field-emission-type scanning electron microscope (FE-SEM) and the length between the surface of the resin portion and the border was measured as the coverage thickness. Thereafter, the average of ten measured points was obtained and determined as the coverage thickness (average thickness).

Preparation of Modeling Liquid 70 parts of water and 30 parts of 3-methyl-1,3-butane diol (manufactured by Tokyo Chemical Industry Co. Ltd.) serving as a fluidity adjusting agent were mixed and stirred to obtain a modeling liquid. [3D object 1] was manufactured with the thus-obtained [Powder II-1 for 3D modeling] and the modeling liquid in the following manner using a form print pattern having a size of 70 mm long×12 mm wide.

1. Using a known powder laminating device as illustrated as in FIG. 1, [Powder material II-1 for 3D modeling] was transferred from the powder storage tank to the 3D modeling tank to form a thin layer of [Powder material II-1 for 3D modeling] having an average thickness of 100 m on a substrate.

2. Next, the modeling liquid was applied (discharged) to the surface of the formed thin layer of [Powder material II-1 for 3D modeling] to dissolve the resin covering the base particles to cause the base particles to adhere to each other.

3. Thereafter, repeating the steps 1 and 2, the thin layer of [Powder material II-1 for 3D modeling] was sequentially laminated to obtain a laminated 3D object having an average thickness of 3 mm. Thereafter, using a drier, the 3D object was dried at 50 degrees C. for four hours and thereafter 100 degrees C. for 20 hours to obtain [Green body 1 for 3D modeling].

Losing shape did not occur to the thus-obtained [Green body 1] when extra [Powder material II-1 for 3D modeling] was removed by air blow.

The thus-obtained [Green body 1 for 3D modeling] was evaluated with regard to infra-red absorption spectrum, bend stress and dimension accuracy in the following manner.

Infra-Red Absorption Spectrum

The infra-red absorption spectrum described in the present disclosure was measured by FTIR Avatar 370, manufactured by Thermo Nicolet Co.). The background was measured to erase the background information and thereafter the infra-red absorption spectrum of a green body for 3D modeling was measured according to an attenuated total reflection (ATR) method while the green body was being pressed and attached to the dispersive element. The number of quantity survey was 20 to obtain measuring data. The peak intensity ratio was calculated based on the data of absorbance (refer to FIG. 3).

Bend Stress

Three-point bend stress of [Green body 1 for 3D modeling] was measured to obtain the intensity (hardness) thereof using a device (Autograph AGS-J, manufactured by Shimadzu Corporation) and a three-point bend test jig (plastic). The bend stress was evaluated according to the following criteria. Evaluation Criteria A: 8.0 MPa or more B: 5.0 MPa to less than 8.0 MPa C: 3.0 MPa to less than 5.0 MPa D: Less than 3.0 MPa Dimension Accuracy The appearance of [Green body 1 for 3D modeling] was observed and the dimension accuracy thereof was evaluated according to the following criteria.

D: Surface of obtained green body for 3D modeling distorted. Base material and organic material locally present by observation of surface C: Surface of obtained green body for 3D modeling slightly distorted and roughened B: State of surface of obtained green body for 3D modeling was good with slight warp A: Obtained green body for 3D modeling having smooth and beautiful surface with no warp The results are shown in Table 3.

Manufacturing of Sintered Compact

[Green body 1 for 3D modeling] obtained as described above was heated by a drier to 400 degrees in a nitrogen atmosphere for defatting. Furthermore, the resultant was subject to sintering treatment at 1,300 degrees C. in a sintering furnace in vacuum condition. As a result, [Green body 1 (sintered object) for 3D modeling] had an aesthetic surface. This sintered compact was a completely integrated stainless structure (metal lump) and not broken at all when slammed down on a hard floor.

Examples II-2 to II-4 and Comparative Example II-1

[Green body 2 for 3D modeling] to [Green body 5 for 3D modeling] were manufactured and evaluated in the same manner as in Example II-1 except that the air supplying temperature condition 10 degrees C. in 3: drying process was changed as shown in Table 3.

Example II-5

[Green body 6 for 3D modeling] was manufactured and evaluated in the same manner as in Example II-1 except that diacetone acrylamide-modified polyvinylalcohol (DF-05, average degree of polymerization: 500, manufactured by JAPAN VAM & POVAL CO., LTD.) was changed to carboxy group-modified polyvinyl alcohol (Gohsenx™ Z-100, average degree of polymerization: 500, manufactured by The Nippon Synthetic Chemical Industry Co., Ltd.).

Example II-6

[Powder material II-3 for 3D modeling] was manufactured in the same manner as in Example II-5 except that carboxy group-modified polyvinyl alcohol (Gohsenx™ Z-100, average degree of polymerization: 500, manufactured by The Nippon Synthetic Chemical Industry Co., Ltd.) was changed to carboxy group-modified polyvinyl alcohol (Gohsenx™ Z-200, average degree of polymerization: 1000, manufactured by The Nippon Synthetic Chemical Industry Co., Ltd.) to manufacture and evaluate [Green body 7 for 3D modeling] in the same manner as in Example II-5.

Examples II-7 to II-9 and Comparative Example II-2

[Green body 8 for 3D modeling] to [Green body 11 for 3D modeling] were manufactured and evaluated in the same manner as in Example II-5 except that the air supplying temperature condition 10 degrees C. in 3: drying process was changed as shown in Table 3.

Example II-10

[Green body 12 for 3D modeling] was manufactured and evaluated in the same manner as in Example II-5 except that 5 parts of ammonium salt of zirconium carbonate (Zircosol AC-20, manufactured by DAIICHI KIGENSO KAGAKU KOGYO CO., LTD.) serving as cross linking agent was admixed and dissolved in the modeling liquid used during manufacturing of 3D object.

Example II-11

[Green body 13 for 3D modeling] was manufactured and evaluated in the same manner as in Example II-5 except that 5 parts of ammonium salt of zirconium lactate (Orgatix ZC 300, manufactured by Matsumoto Fine Chemical Co. Ltd.) serving as cross linking agent was admixed and dissolved in the modeling liquid used during manufacturing of 3D object.

Example II-12

[Powder material II-4 for 3D modeling] was manufactured in the same manner as in Example II-1 except that diacetone acrylamide-modified polyvinylalcohol (DF-05, average degree of polymerization: 500, manufactured by JAPAN VAM & POVAL CO., LTD.) was changed to a copolymer of butanediol vinylalcohol (Nichigo G-Polymer™, OKS-1080, average degree of polymerization: 600, manufactured by The Nippon Synthetic Chemical Industry Co., Ltd.) to manufacture and evaluate [Green body 14 for 3D modeling] in the same manner as in Example II-1.

Example II-13

[Powder material II-5 for 3D modeling] was manufactured in the same manner as in Example II-12 except that the copolymer of butanediol vinylalcohol (Nichigo G-Polymer™, average degree of polymerization, manufactured by The Nippon Synthetic Chemical Industry Co., Ltd.) was changed to a copolymer of butanediol vinylalcohol (Nichigo G-Polymer™ OKS-8049, average degree of polymerization: 450, manufactured by The Nippon Synthetic Chemical Industry Co., Ltd.) to manufacture and evaluate [Green body 15 for 3D modeling] in the same manner as in Example II-1.

Examples II-14 to II-16 and Comparative Example II-3

[Green body 16 for 3D modeling] to [Green body 19 for 3D modeling] were manufactured and evaluated in the same manner as in Example II-12 except that the air supplying temperature condition 10 degrees C. in 3: drying process was changed as shown in Table 3.

Example II-17

[Powder material II-6 for 3D modeling] and [Green body 20 for 3D modeling] were manufactured in the same manner as in Example II-5 except that the base material was changed to alumina (AHP30, volume average particle diameter: 40 μm, manufactured by Nippon Light Metal Company, Ltd.). The thus-obtained [Green body 20 for 3D modeling] was evaluated in the same manner as in Example II-5.

Examples II-18 to II-20 and Comparative Example II-4

[Green body 21 for 3D modeling] to [Green body 24 for 3D modeling] were manufactured and evaluated in the same manner as in Example II-17 except that the air supplying temperature condition 10 degrees C. in 3: drying process was changed as shown in Table 3.

Example II-21

[Powder material II-7 for 3D modeling] and [Green body 25 for 3D modeling] were manufactured in the same manner as in Example II-5 except that the base material was changed to zirconia (TZ-B53, volume average particle diameter: 50 μm, manufactured by TOSOH CORPORATION). The thus-obtained [Green body 25 for 3D modeling] was evaluated in the same manner as in Example II-5. The results are shown in Table 3.

Examples II-22 to II-24 and Comparative Example II-5

[Green body 26 for 3D modeling] to [Green body 29 for 3D modeling] were manufactured and evaluated in the same manner as in Example II-21 except that the air supplying temperature condition 10 degrees C. in 3: drying process was changed as shown in Table 3.

The evaluation results for the powder materials and the 3D objects manufactured in each Example and Comparative Example are shown in Table 3. The resins used to cover the base materials are represented by R1 to R5 in Table 3 and the materials and the product names of the resins R1 to R5 are shown in Table 2.

TABLE 3

|  | 3D modeling No. | Powder material No. | Base material | Resin Symbol | Product No. | Cross-linking agent | Thickness |
|---|---|---|---|---|---|---|---|
| Example II-1 | 1 | II-1 | SUS | R1 | DF-05 |  | 300 nm |
| Example II-2 | 2 | II-1 | SUS | R1 | DF-05 |  | 300 nm |
| Example II-3 | 3 | II-1 | SUS | R1 | DF-05 |  | 300 nm |
| Example II-4 | 4 | II-1 | SUS | R1 | DF-05 |  | 300 nm |
| Comparative Example II-1 | 5 | II-1 | SUS | R1 | DF-05 |  | 300 nm |
| Example II-5 | 6 | II-2 | SUS | R2 | Z-100 |  | 300 nm |
| Example II-6 | 7 | II-3 | SUS | R3 | Z-200 |  | 300 nm |
| Example II-7 | 8 | II-2 | SUS | R2 | Z-100 |  | 300 nm |
| Example II-8 | 9 | II-2 | SUS | R2 | Z-100 |  | 300 nm |
| Example II-9 | 10 | II-2 | SUS | R2 | Z-100 |  | 300 nm |
| Comparative Example II-2 | 11 | II-2 | SUS | R2 | Z-100 |  | 300 nm |
| Example II-10 | 12 | II-2 | SUS | R2 | Z-100 | AC-20 | 300 nm |
| Example II-11 | 13 | II-2 | SUS | R2 | Z-100 | ZC-300 | 300 nm |
| Example II-12 | 14 | II-4 | SUS | R4 | G-1080 |  | 300 nm |
| Example II-13 | 15 | II-5 | SUS | R5 | G-8049 |  | 300 nm |
| Example II-14 | 16 | II-4 | SUS | R4 | G-1080 |  | 300 nm |
| Example II-15 | 17 | II-4 | SUS | R4 | G-1080 |  | 300 nm |
| Example II-16 | 18 | II-4 | SUS | R4 | G-1080 |  | 300 nm |
| Comparative Example II-3 | 19 | II-4 | SUS | R4 | G-1080 |  | 300 nm |
| Example II-17 | 20 | II-6 | Alumina | R2 | Z-100 |  | 300 nm |
| Example II-18 | 21 | II-6 | Alumina | R2 | Z-100 |  | 300 nm |
| Example II-19 | 22 | II-6 | Alumina | R2 | Z-100 |  | 300 nm |
| Example II-20 | 23 | II-6 | Alumina | R2 | Z-100 |  | 300 nm |
| Comparative Example II-4 | 24 | II-6 | Alumina | R2 | Z-100 |  | 300 nm |
| Example II-21 | 25 | II-7 | zirconia | R2 | Z-100 |  | 300 nm |
| Example II-22 | 26 | II-7 | zirconia | R2 | Z-100 |  | 300 nm |
| Example II-23 | 27 | II-7 | zirconia | R2 | Z-100 |  | 300 nm |
| Example II-24 | 28 | II-7 | zirconia | R2 | Z-100 |  | 300 nm |
| Comparative Example II-5 | 29 | II-7 | zirconia | R2 | Z-100 |  | 300 nm |

|  | Processing condition | | Drying process | | | Evaluation on green body for 3D modeling | | |
|---|---|---|---|---|---|---|---|---|
|  |  | Air supplying temp. (degrees C.) | 20 hour drying temp. (degrees C.) |  | | Bend stress | | |
|  | Processing method | | | IR peak intensity ratio | Measuring value (MPa) | Evaluation | Dimension accuracy | Other |
| Example II-1 | Coating | 80 | 100 | 0.58 | 6.7 | B | B |  |
| Example II-2 | Coating | 80 | 115 | 0.63 | 7.2 | B | B |  |
| Example II-3 | Coating | 80 | 130 | 0.69 | 7.8 | B | B |  |
| Example II-4 | Coating | 80 | 150 | 0.75 | 8.2 | A | C |  |

TABLE 3-continued

| | | | | | | | | |
|---|---|---|---|---|---|---|---|---|
| Comparative Example II-1 | Coating | 80 | 80 | 0.53 | 4.8 | C | B | scar |
| Example II-5 | Coating | 80 | 100 | 0.68 | 6.6 | B | B | |
| Example II-6 | Coating | 80 | 100 | 0.68 | 6.9 | B | B | |
| Example II-7 | Coating | 80 | 80 | 0.63 | 5.2 | B | B | |
| Example II-8 | Coating | 80 | 120 | 0.74 | 7.2 | B | B | |
| Example II-9 | Coating | 80 | 140 | 0.78 | 8.2 | A | C | |
| Comparative Example II-2 | Coating | 80 | 155 | 0.82 | 8.8 | A | D | |
| Example II-10 | Coating | 80 | 100 | 0.68 | 8.7 | A | A | |
| Example II-11 | Coating | 80 | 100 | 0.68 | 8.3 | A | A | |
| Example II-12 | Coating | 80 | 100 | 0.56 | 6.6 | B | B | |
| Example II-13 | Coating | 80 | 100 | 0.56 | 6.6 | B | B | |
| Example II-14 | Coating | 80 | 120 | 0.63 | 7.3 | B | B | |
| Example II-15 | Coating | 80 | 140 | 0.68 | 8.0 | A | B | |
| Example II-16 | Coating | 80 | 150 | 0.70 | 8.2 | A | B | |
| Comparative Example II-3 | Coating | 80 | 90 | 0.52 | 4.8 | C | B | scar |
| Example II-17 | Coating | 80 | 100 | 0.68 | 6.8 | B | B | |
| Example II-18 | Coating | 80 | 80 | 0.63 | 5.4 | B | B | |
| Example II-19 | Coating | 80 | 120 | 0.74 | 7.4 | B | B | |
| Example II-20 | Coating | 80 | 140 | 0.78 | 8.3 | A | C | |
| Comparative Example II-4 | Coating | 80 | 155 | 0.84 | 8.9 | A | D | |
| Example II-21 | Coating | 80 | 100 | 0.68 | 6.3 | B | B | |
| Example II-22 | Coating | 80 | 80 | 0.63 | 5.0 | B | B | |
| Example II-23 | Coating | 80 | 120 | 0.74 | 7.0 | B | B | |
| Example II-24 | Coating | 80 | 140 | 0.78 | 8.0 | A | C | |
| Comparative Example II-5 | Coating | 80 | 155 | 0.83 | 8.5 | A | D | |

AC-20: Zircosol AC-20, manufactured by DAIICHI KIGENSO KAGAKU KOGYO CO., LTD.)
ZC-300: Orgatix ZC-300, manufactured by Matsumoto Fine Chemical Co. Ltd.)

According to the present disclosure, a powder material for 3D modeling is provided to manufacture a complex 3D object having high level of safety, sufficient strength to maintain the steric (3D) form, and high level of accuracy.

Having now fully described embodiments of the present invention, it will be apparent to one of ordinary skill in the art that many changes and modifications can be made thereto without departing from the spirit and scope of embodiments of the invention as set forth herein.

What is claimed is:

1. A powder material for three-dimensional modeling comprising:
   a base particle; and
   a resin covering the base particle,
   wherein the powder material is used for three-dimensional modeling and the resin has a first absorption peak in a range of from 1,141 $cm^{-1}$ to 1,145 $cm^{-1}$ and a second absorption peak in a range of from 1,089 $cm^{-1}$ to 1,093 $cm^{-1}$ in an infrared absorption spectrum and an intensity ratio of the first absorption peak to the second absorption peak is from 0.40 to 0.70.

2. The powder material according to claim 1, wherein the base particle includes metal or ceramic.

3. The powder material according to claim 1, wherein the resin includes a modified polyvinyl alcohol having an acetoacetyl group, a carbonyl group, or a butanediol group.

4. The powder material according to claim 3, wherein the resin has a degree of average polymerization of from 400 to 1,100.

5. The powder material according to claim 1, wherein a coverage thickness of the base particle by the resin is from 30 nm to 500 nm.

6. A kit for three-dimensional modeling comprising:
   the powder material of claim 1; and
   a modeling liquid including a solvent configured to dissolve the resin.

7. The kit according to claim 6, wherein the modeling liquid includes a cross-linking agent to cross-link with the resin.

8. A method of manufacturing a three-dimensional object comprising:
   forming a layer of the powder material of claim 1 on a substrate,
   applying a modeling liquid including a solvent configured to dissolve the resin to an area of the layer; and
   repeating the forming and the applying to manufacture the three-dimensional object.

9. The method of manufacturing a three-dimensional object according to claim 8, wherein the modeling liquid is applied according to an inkjet discharging method.

10. A device for manufacturing a three-dimensional object comprising:
    a powder material layer forming device configured to form a layer of the powder material of claim 1 on a substrate; and
    a modeling liquid applying device configured to apply a modeling liquid including a solvent to dissolve the resin.

11. A three-dimensional green body comprising:
    a base material; and
    a resin,
    wherein the three-dimensional green body is used for three-dimensional modeling and the resin has a first absorption peak in a range of from 1,141 $cm^{-1}$ to 1,145 $cm^{-1}$ and a second absorption peak in a range of from 1,089 $cm^{-1}$ to 1,093 $cm^{-1}$ in an infrared absorption spectrum and an intensity ratio of the first absorption peak to the second absorption peak is from 0.55 to 0.80.

12. A method of manufacturing the three-dimensional green body of claim 11;
    forming a layer of a powder material for three-dimensional modeling on a substrate, the powder material including the base material and the resin from;

applying a modeling liquid to an area of the layer, the modeling liquid including a solvent to dissolve the resin; and repeating the forming and the applying to manufacture the three-dimensional green body.

13. A device for manufacturing the green body of claim 11 comprising:

a powder material layer forming device to form a layer of a powder material for three-dimensional modeling on a substrate, the powder material including the base material and the resin from; and a modeling liquid applying device to apply a modeling liquid to an area of the layer, the modeling liquid including a solvent to dissolve the resin.

* * * * *